United States Patent [19]
Hallam et al.

[11] 3,858,661
[45] Jan. 7, 1975

[54] MOTOR GRADERS

[75] Inventors: Edwin Carey Hallam; Heather Hallam, both of Westerby, England

[73] Assignee: E. C. Hallam and Company, Smeeton, Westerby, England

[22] Filed: Oct. 25, 1972

[21] Appl. No.: 300,800

[30] Foreign Application Priority Data
Nov. 5, 1971 Great Britain.............. 51454/71

[52] U.S. Cl. .................................. 172/1, 172/781
[51] Int. Cl. ........................................ C02f 3/76
[58] Field of Search .................... 172/781–785, 172/790, 430, 611

[56] References Cited
UNITED STATES PATENTS

| | | | |
|---|---|---|---|
| 2,081,536 | 5/1937 | Gustafson | 172/611 X |
| 3,233,349 | 2/1966 | Becton | 172/430 X |
| 3,327,413 | 6/1967 | Brinkmeyer et al. | 172/785 |
| 3,454,109 | 7/1969 | Roberts | 172/781 |

Primary Examiner—Stephen C. Pellegrino
Attorney, Agent, or Firm—Larson, Taylor and Hinds

[57] ABSTRACT

The invention concerns motor graders having a grader blade adjustable mounted between front and rear wheels and the engine mounted on a support cantilevered out to the rear from the rear wheel axle housing. The motor graders have good traction and provide good driver observation and are easy and cheaply constructed.

5 Claims, 4 Drawing Figures

MOTOR GRADERS

The invention relates to motor graders for use in levelling surfaces.

Motor graders are usually constructed with the engine supported over driven rear wheels or in a position between front and rear wheels. Such graders are produced by assembly from its component parts which is expensive or by assembly using a frame into which a tractor is driven facing forward which have marked disadvantages in operation.

It is an object of the invention to provide a tractor having a relatively increased weight on the driven rear wheels, which provides good operator supervision, which is reliable and inexpensive to construct and yet satisfies demanding operating requirements.

The invention relates to motor graders.

The invention provides a motor grader comprising a longitudinal frame having mounted adjacent the front a pair of steerable wheels and adjacent the rear one pair or tandem pair of drivable wheels, a grader blade mounted on the frame between the steerable and drivable wheels and an engine unit cantilevered to the rear from an axle housing on which the drivable wheels are mounted. Preferably the frame comprises a first main portion supporting the steerable wheels and the grader blade and a second main portion secured to the first supporting the drivable wheels, axle housing and engine unit and a driver's station is positioned above the axle housing and in front of the engine unit. Suitably the drivable wheels support from three quarters to one half of the total weight of the grader. Conveniently the first main frame portion comprises a pair of transversely spaced beams extending underneath the axle housing and secured to the engine unit. The motor grader can be cheaply constructed by a method which comprises constructing the first main frame portion; removing the front axle, steerable wheels and associated steering equipment from a tractor or tractor skid unit conveniently of an instant reverse type having a hydraulic torque converter; mounting the front axle, steerable wheels and associated steering equipment on the first main frame portion; and securing the rear of the tractor or tractor skid unit to the first main frame portion to serve as the second main frame portion. The rear of the tractor or tractor skid unit is preferably secured to the first main frame portion before the front axle, steerable wheels and associated steering equipment have been removed from the tractor or tractor skid unit. The weight of the first main frame portion can then tip the tractor or tractor skid unit to enable the various parts to be conveniently removed. Preferably the front of the first main frame portion is adapted to receive the various parts by securing to it a spare front wheel mounting of the tractor or tractor skid unit. The invention also provides an attachment comprising a longitudinal frame having mounted on it a grader blade, steerable wheels at the front of the frame and the rear of the frame being adapted for rigidly securing to the rear of a tractor or tractor skid unit which can be combined to yield a motor grader.

The steerable wheels are preferably mounted one on each end of a pivotable transverse shaft. Preferably the attachment is adapted for securing to the tractor by a pair of transversely spaced beams for extending underneath and alongside the tractor. Conveniently the attachment or first frame portion is secured by bolting the beams to the tractor or tractor skid unit at positions underneath the engine and underneath the rear axle. Such attachments can be combined in a simple manner with a tractor to give an integral power grader, the tractor being driven in reverse to move the grader forward. The front wheels and associated steering of the tractor can be transferred to the attachment and serve as the steerable wheels of the attachment. The tractor used should preferably be able to be driven forwardly and in reverse at similar speeds and have a similar choice of transmissions under both conditions. The tractor may therefore be a directional reverse tractor such as a Massey Fergusson MF 50 type.

Such motor grader can be constructed in a simple manner using to a large extent the cheap and reliable mass-produced parts of a tractor. The construction further enables the rear wheels to carry a predominant amount of the total weight aiding traction and enables the driver to be positioned in a position where the grader blade can be easiliy observed.

The motor grader may also be provided additionally with a hydraulic motor associated with the front wheels to provide four wheel drive.

The invention is more particularly described with reference to the drawings in which.

Figure 1:
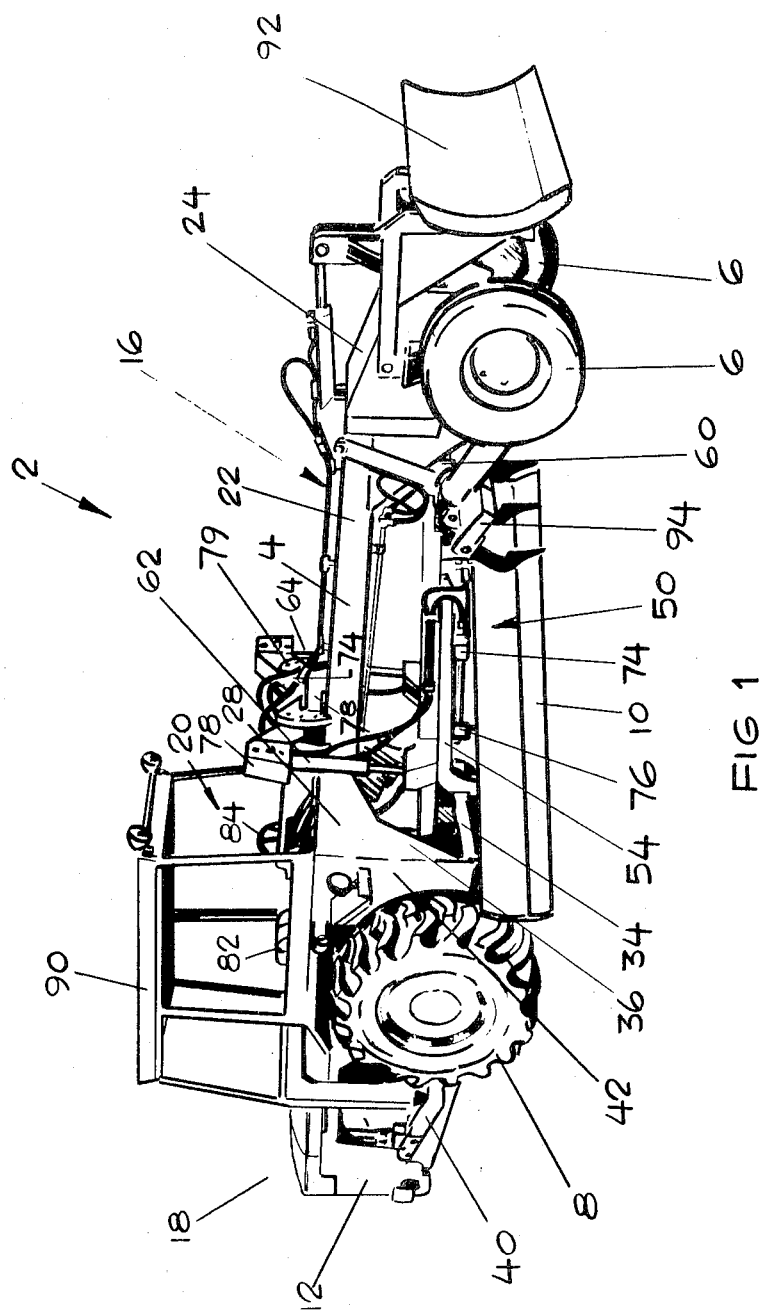
FIG. 1 is a perspective view of a motor grader according to the invention.
Figure 2:
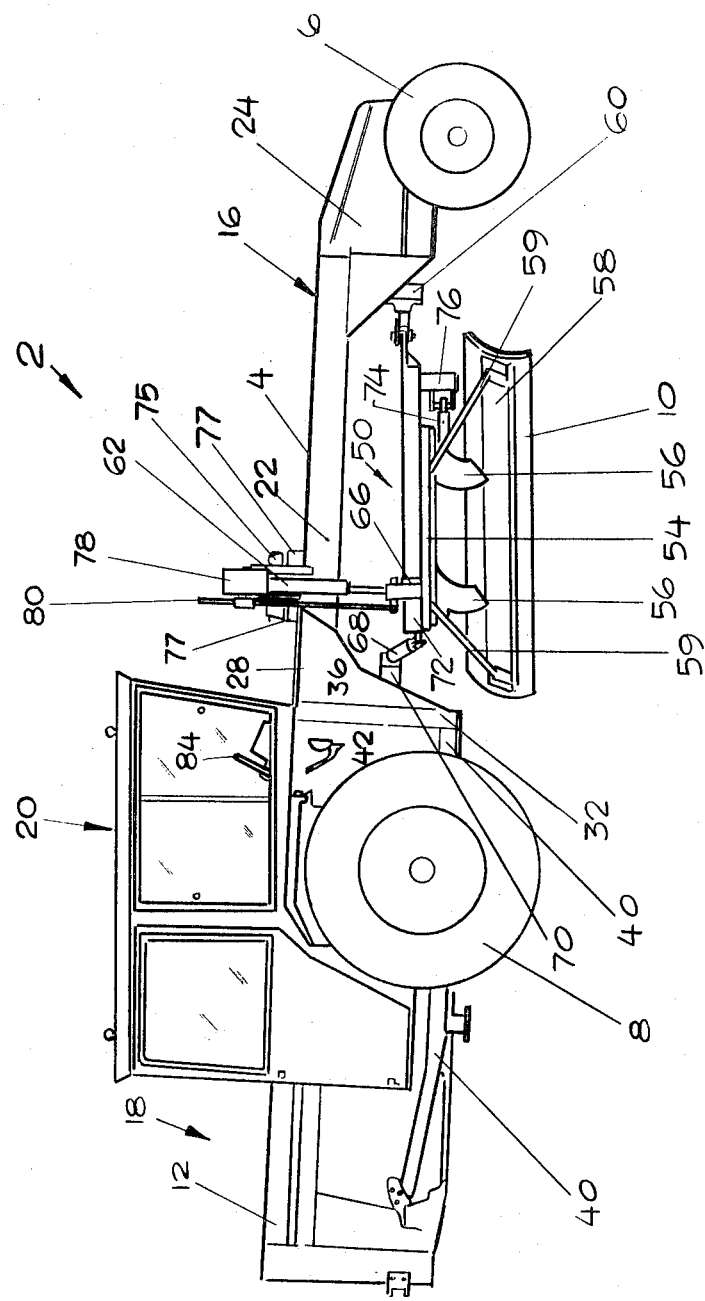
FIG. 2 is a schematic side view of the motor grader of FIG. 1.

With reference to FIGS. 1 and 2 and a motor grader 2 comprises a longitudinal frame 4 having at the front a pair of small diameter steerable wheels 6 supported by an axle, a pair of large diameter drivable wheels 8, a grader blade 10 depending from the longitudinal frame 4 at a position between the wheels 6 and 8 and an engine unit 12 driving the wheels 8 which cantilevered out rearwardly and connected to an axle housing 14 on which the wheels 8 are mounted. The motor grader 2 comprises two constructional units which are joined together as hereinafter described. A first main portion 16 comprises the longitudinal frame 4, the front wheels 6 and the grader blade and its mounting. A second main portion 18 comprises the rear drivable wheels 8 and the engine unit 12 and axle housing 14. A drivers station 20 is mounted over the axle housing 14 in front of the engine unit 12.

Figure 3:
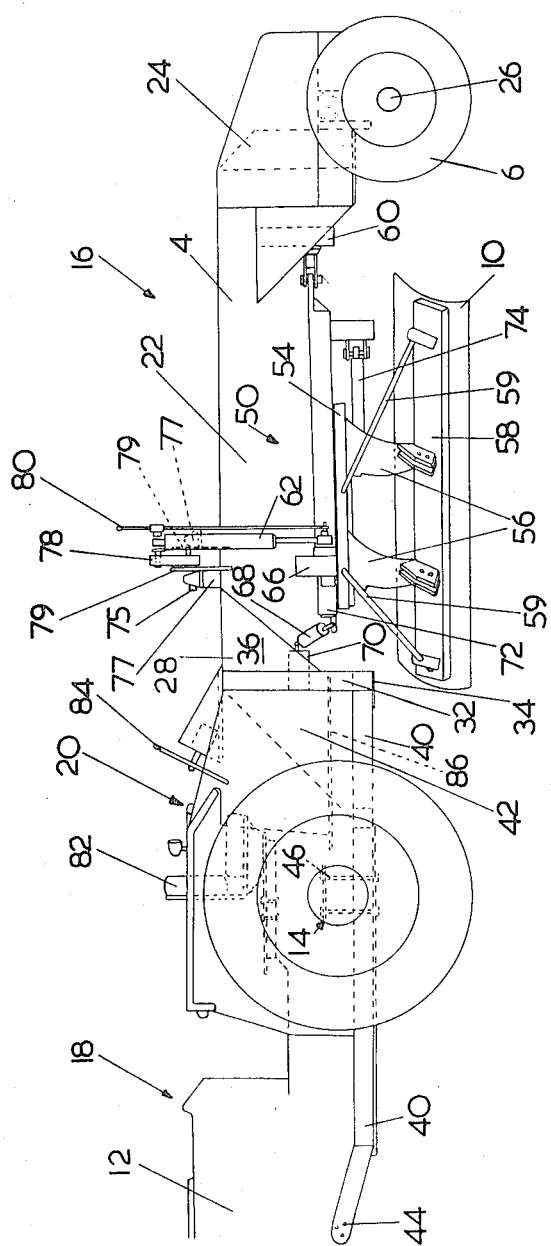
FIG. 3 is a side view of a first main portion of the motor grader of FIG. 1.
Figure 4:
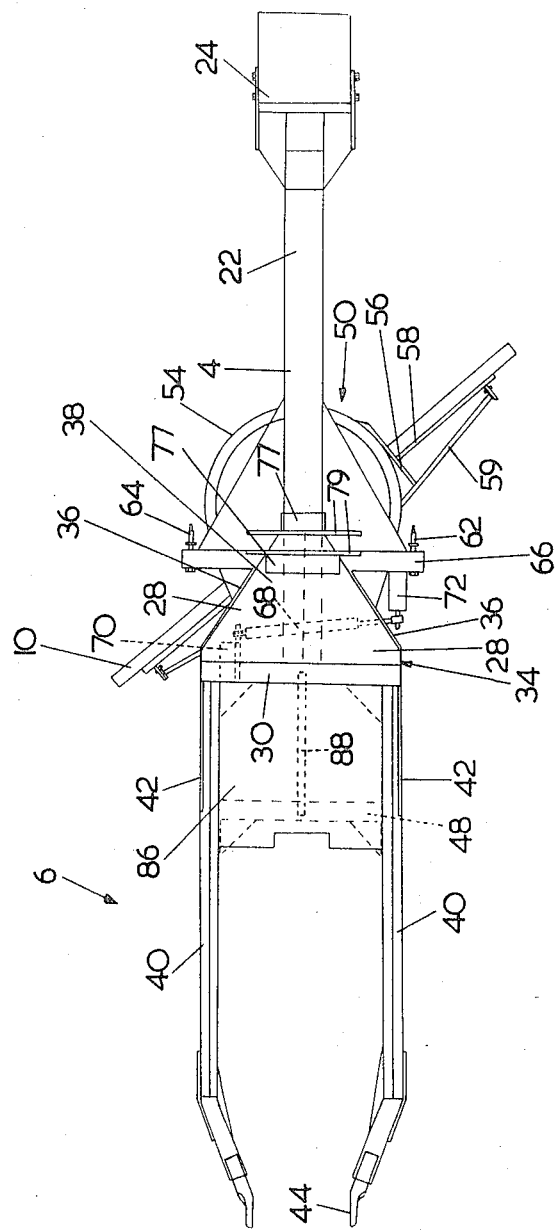
FIG. 4 is a top elevation of the first main portion shown in FIG. 3.

With reference to FIGS. 3 and 4, the frame 4 consists principally of two adjacent longitudinally extending beams 22. At the front of the frame 4, the top of an upstanding box construction 24 is welded to the beams 22 and underneath is secured a laterally extending front wheel support frame obtained as a cheap spare part of the mass-produced tractor to which the frame is to be joined. The steerable wheels 6 are secured on a pivot shaft 26 mounted underneath the support frame. The arrangement of the wheels 26 is the same as the arrangement of the steering wheels on the front of a tractor. At the rear of the frame 4, the beams 22 are joined to two diverging frame members 28. At the rear of the frame members 28 there is secured a transversely extending member 30 interconnecting the ends of the member 28 and downwardly extending members 32, which in turn are interconnected at their lower end by a transverse member 34. The members 28 and 32 are secured in their respective angular position by a metal plate 36 and the members 28 themselves are secured by a plate 38. At the lower end of the member 32 there are also secured rearwardly extending beams 40 held in position by plates 42. At the end of each beam 40 holes 44 are provided for bolts to secure the first main portion 16 to the second main portion 18. At the appropriate position on each beam 40 there are brackets 46 to enable the attachment to be secured to the rear axle housing 14. The beams 40 are spaced transversely in a position adjacent to the rear axle housing 14 by a transverse member 48.

Underneath the beams 22 there is mounted a sub-frame 50 on which the grader blade 10 is adjustably mounted. There is a ring 54 which can turn about a vertical axis on the frame 50 to adjust the angle of attack of the blade and which carries depending brackets 56 to which a backing strip 58 of the blade 10 is anchored. Link rods 59 connect the upper part of the backing piece 58 to the ring 54 and permit adjustment of the slant of the grader blade 10 as viewed edge wise from one end of the blade. The sub-frame 50 is slung between a bracket 60 depending from near the front end of the frame 4 on the one hand and two fluid pressure operated rams 62 and 64 on the other hand. The rams 62 and 64 are positioned one on each side of the frame 4 and serve to raise and lower the grader blade 10 as required. The rams 62 and 64 are anchored to posts on a cross-member 66 of the sub-frame 50 at their lower end. To stabilize the sub-frame an adjustable telescopic steadying link 68 is connected between a post 70 connected to one of the downwardly extending members 32 and a block 72 on the cross-member 66.

To control the angle of attack of the grader blade 10 a ram 74 is connected to a part 76 underneath the frame 50 and to the grader blade 10. The sub-frame 50 can be put in a laterally canted position together with the grader blade 10 by tilting a transverse member 78, which has upwardly inclined ends to which the upper ends of the rams 62 and 64 are attached, on a pivot 75 mounted on the beams 22 by means of posts 77 and by securing the transverse member 78 in any one of a a number of alternative positions to plates 79 on the beams 22 by pins. The sub-frame 50 is therefore secured at the forward end in the bracket 60 in a pivotable manner. Alongside the rams 62 and 64 there are rods 80 mounted centrally on a rose spherical bearing or similar bearings which enable the setting of the grader blade 10 to be easily determined, by the use of an indicator moving over a coloured scale.

An operator's seat 82 is mounted on the second main portion 18 in a back to front relationship. A steering wheel 84 and grader control instruments are positioned on the first main portion 16 and a foot rest 86 is provided extending between the beams 40 to the axle 14 up to the member 34 which is supported by a member 88.

In FIGS. 1 and 2 the driver's station 20 is shown enclosed within a cab 90. In FIG. 1 there are further shown mounted on the motor grader adjacent the front a bulldozer 92 and a scarifier 94 rigidly secured to the box construction 24 and hydraulically operated.

The second main portion 18 is basically a mass-produced tractor for example agricultural or industrial tractors having a full range of speeds for driving in a reverse direction and preferably one capable of an instant reversal of direction such as the Massey-Fergusson MF 50 tractor.

To construct the motor grader previously described the first main portion 16 as described with reference to FIGS. 3 and 4 is constructed. The tractor is then secured to the beams 40 in a back to front relationship. The front axle of a Massey-Fergusson MF 50 tractor is subsequently removed and mounted on the special support frame secured to the upstanding box construction 24 together with the necessary steering gear. Then the various necessary minor alterations such as reversal of driver's seat and the necessary hydraulic and control connections can be made. Usually the two portions 16 and 18 are secured together by bolts but other equivalent techniques may be used.

Using this method of construction a motor grader is obtained which compares favourably with specially produced motor graders but whose cost is considerably reduced.

We claim:

1. A method of making a motor grader, which method comprises: constructing a first structural frame portion having a longitudinally extending beam adapted to mount adjacent a front end thereof an axle and steerable wheels and adapted to carry a grader blade in between said front end and a rear end of said beam; constructing a second structural frame portion by dismantling a self-supported operative tractor which is drivable in opposite directions at similar speeds by means of drivable rear wheels, and has a front axle and steerable front wheels and a driver's station having a steering mechanism operatively connected to the steerable front wheels by removing therefrom the front axle, front wheels and associated steering equipment including the connection of the said steering mechanism and the steering wheels, assembling said first and second structural portions together to provide a rigid connection therebetween with the rear of said tractor connecting to the rear end of the beam, mounting an axle and steerable front wheels adjacent the front end of the beam and a grader blade underneath the frame with a forward operative side of the grader blade facing the steerable front wheels and operatively connecting a steering mechanism at the driver's station to the steerable wheels at the front end of the beam.

2. A method as claimed in claim 1, in which the axle and the steerable wheels dismantled from the tractor are mounted adjacent the front wheels.

3. A method as claimed in claim 2 in which the longitudinally extending beam is adapted to mount the axle by fitting a front wheel support identical to the front wheel support of the tractor adjacent the front end of the beam.

4. A method as claimed in claim 1 incuding modifying the driver's station of the tractor by positioning the driver's seat to face toward the front end of the beam and wherein the steps of operatively connecting the steering mechanism includes mounting a steering wheel adjacent the rear end of the beam to place the driver in a position overlooking the grader blade in the assembled grader.

5. A method as claimed in claim 1 in which the first structural portion comprises a pair of transversely spaced longitudinal members rigidly secured to the rear end of the beam and extending parallel to the beam at a level below the beam such that in said assembling step the member is passed underneath an axle interconnecting the drivable rear wheels of the tractor to support the front end of the tractor.

* * * * *